United States Patent [19]

Najmolhoda

[11] Patent Number: 4,988,074
[45] Date of Patent: Jan. 29, 1991

[54] PROPORTIONAL VARIABLE FORCE SOLENOID CONTROL VALVE

[75] Inventor: Hamid Najmolhoda, Grandville, Mich.

[73] Assignee: Hi-Ram, Inc., Coopersville, Mich.

[21] Appl. No.: 194,787

[22] Filed: May 17, 1988

[51] Int. Cl.⁵ .......................... F16K 31/08; H01F 7/08
[52] U.S. Cl. .................................. 251/129.08; 251/65; 251/129.15; 335/230; 335/274
[58] Field of Search ...................... 251/129.08, 129.17, 251/129.18, 129.2, 65, 129.15; 335/229, 230, 256, 266, 268, 274

[56] References Cited

U.S. PATENT DOCUMENTS

| | | |
|---|---|---|
| 2,447,067 | 8/1948 | Hamilton . |
| 2,690,529 | 9/1954 | Linbald ................................ 335/256 |
| 2,777,456 | 1/1957 | Ey . |
| 3,094,132 | 6/1963 | Byloff . |
| 3,532,121 | 10/1970 | Sturman et al. ................. 251/129.17 |
| 3,570,806 | 3/1971 | Sturman et al. ........................ 251/65 |
| 3,570,807 | 3/1971 | Sturman et al. ........................ 251/65 |
| 3,598,138 | 8/1971 | Hadley . |
| 3,684,238 | 8/1972 | Michellone et al. . |
| 3,814,376 | 6/1974 | Reinicke ................................ 251/65 |
| 3,821,910 | 7/1974 | Tjaden . |
| 3,861,643 | 1/1975 | Moffatt .......................... 251/129.08 |
| 3,926,405 | 12/1975 | Arnold . |
| 3,977,436 | 8/1976 | Larner ................................... 251/65 |
| 3,985,333 | 10/1976 | Paulsen . |
| 4,002,318 | 1/1977 | Koch .............................. 251/129.08 |
| 4,067,541 | 1/1978 | Hunter . |
| 4,108,420 | 8/1978 | West et al. . |
| 4,119,294 | 10/1978 | Schnorrenberg . |
| 4,193,421 | 3/1980 | Sakakibara et al. . |
| 4,207,914 | 6/1980 | Holloway et al. . |
| 4,245,815 | 1/1981 | Willis . |
| 4,313,590 | 2/1982 | Nishimiya . |
| 4,314,585 | 2/1982 | Nishimiya et al. . |
| 4,339,109 | 7/1982 | Kawata et al. . |
| 4,361,309 | 11/1982 | Sogabe . |
| 4,403,765 | 9/1983 | Fisher ..................................... 251/65 |
| 4,428,559 | 1/1984 | Ichiryu et al. . |
| 4,452,424 | 6/1984 | Kawata . |
| 4,463,332 | 7/1984 | Everett ............................... 335/274 |
| 4,483,369 | 11/1984 | Akagi et al. . |
| 4,605,197 | 8/1986 | Casey et al. . |
| 4,621,660 | 11/1986 | Klocke . |
| 4,623,118 | 11/1986 | Kumar . |
| 4,635,683 | 1/1987 | Nielsen .......................... 251/129.18 |
| 4,643,227 | 2/1987 | Suzuki et al. . |
| 4,662,605 | 5/1987 | Garcia . |
| 4,664,136 | 5/1987 | Everett . |
| 4,682,135 | 7/1987 | Yamakawa ........................ 335/230 |
| 4,723,753 | 2/1988 | Torimoto et al. .............. 251/129.08 |
| 4,732,362 | 3/1988 | Morioka et al. ............... 251/129.17 |
| 4,767,097 | 8/1988 | Everett et al. ................. 251/129.08 |
| 4,790,345 | 12/1988 | Kolchinsky .................... 251/129.08 |

FOREIGN PATENT DOCUMENTS

| | | |
|---|---|---|
| 15167 | 1/1982 | Japan ............................. 251/129.08 |

*Primary Examiner*—George L. Walton
*Attorney, Agent, or Firm*—Leon E. Redman; Malcolm L. Sutherland

[57] ABSTRACT

A proportional variable force solenoid control valve with an armature reciprocably movable within the bore hole of a coreless solenoid bobbin in proportion to applied electrical current between positions corresponding to a closed valve position and a fully open position. The positioning of the armature is controlled by balancing the variable force of the magnetic field of the coreless solenoid plus the force of the magnetic field of a permanent ring magnet against the force of a coil spring which biases the valve toward the closed position. The armature is suspended by low spring rate plate springs on opposite ends of the armature. An elastomeric diaphragm seals the solenoid against contaminants. The force of the coil spring is adjusted by a threaded plug.

26 Claims, 2 Drawing Sheets

PROPORTIONAL VARIABLE FORCE SOLENOID CONTROL VALVE

FIELD OF THE INVENTION

This invention relates to control valve for regulating fluid pressure and, more particularly, to a proportional variable force solenoid operated valve wherein the pressure is regulated by a variable force which is proportional to the magnitude of electrical current applied to the solenoid.

While proportional variable force solenoid control valves are employed in various fluid control applications, a typical application is to modulate main line fluid pressure in an electronic transmission to control the smoothness of shifting between gears of the electronic transmission.

BACKGROUND OF THE INVENTION

Prior proportional variable force solenoids typically require very close tolerances and precise adjustment of the air gap between the armature and a pole piece in order to attempt to achieve proportional control characteristics.

Other such solenoids involve the use of a trunk pole piece in order that the magnetic field operating on the armature is a function solely of flux density rather than a combination of magnetic circuit permeance and flux density. The trunk pole piece is adjustable in order to change the core gap to achieve proportional control. In addition to the additional bulk, complexity and cost of employing a pole piece, such prior art devices are expensive to manufacture and require close manufacturing tolerances.

It is an object of the invention to eliminate the need to maintain the close manufacturing tolerances associated with the air gap in a solenoid while also eliminating the need for an adjustable air gap.

Another object of this invention is to significantly reduce the cost of manufacture of a proportional variable force solenoid operated valve while maintaining substantially linear proportional control.

It is a further object of this invention to simplify the design and assembly of such solenoid control valves.

It is also an object of this invention to improve the reliability of such solenoid operated valves.

It is yet a further object of this invention to reduce the size of a proportional variable force solenoid operated valve.

SUMMARY OF THE INVENTION

A proportional variable force solenoid operated valve employs a solenoid constructed with an armature suspended within the longitudinal bore of the solenoid bobbin with a permanent ring magnet disposed adjacent one end of the armature creating a magnetic field which biases the armature toward a position corresponding to an open valve position. A coil spring biases the armature toward a position corresponding to a closed valve position providing a balancing force against the magnetic field of the permanent ring magnet. The force of the magnetic field of the coreless solenoid varies in proportion to the magnitude of electrical current applied to the solenoid and in turn moves the armature between open and closed valve positions in proportion to the magnitude of such electrical current without the requirement of a separate pole piece. This provides a proportional variable force control valve which employs a coreless solenoid without an air gap thereby simplifying the design, lowering the cost of manufacture, while providing a more compact design and improving the reliability of such valves.

The foregoing and other objects, features and advantages of the invention will be apparent from the following more particular description of a preferred embodiment of the invention as illustrated in the accompanying drawing.

BRIEF DESCRIPTION OF THE DRAWING

FIG. 4 is a view in vertical cross section taken along the line 4—4 in FIG. 2; and FIG. 5 is a view in vertical cross section taken along the line 5—5 in FIG. 2.

DESCRIPTION OF THE PREFERRED EMBODIMENT

Figure 1:
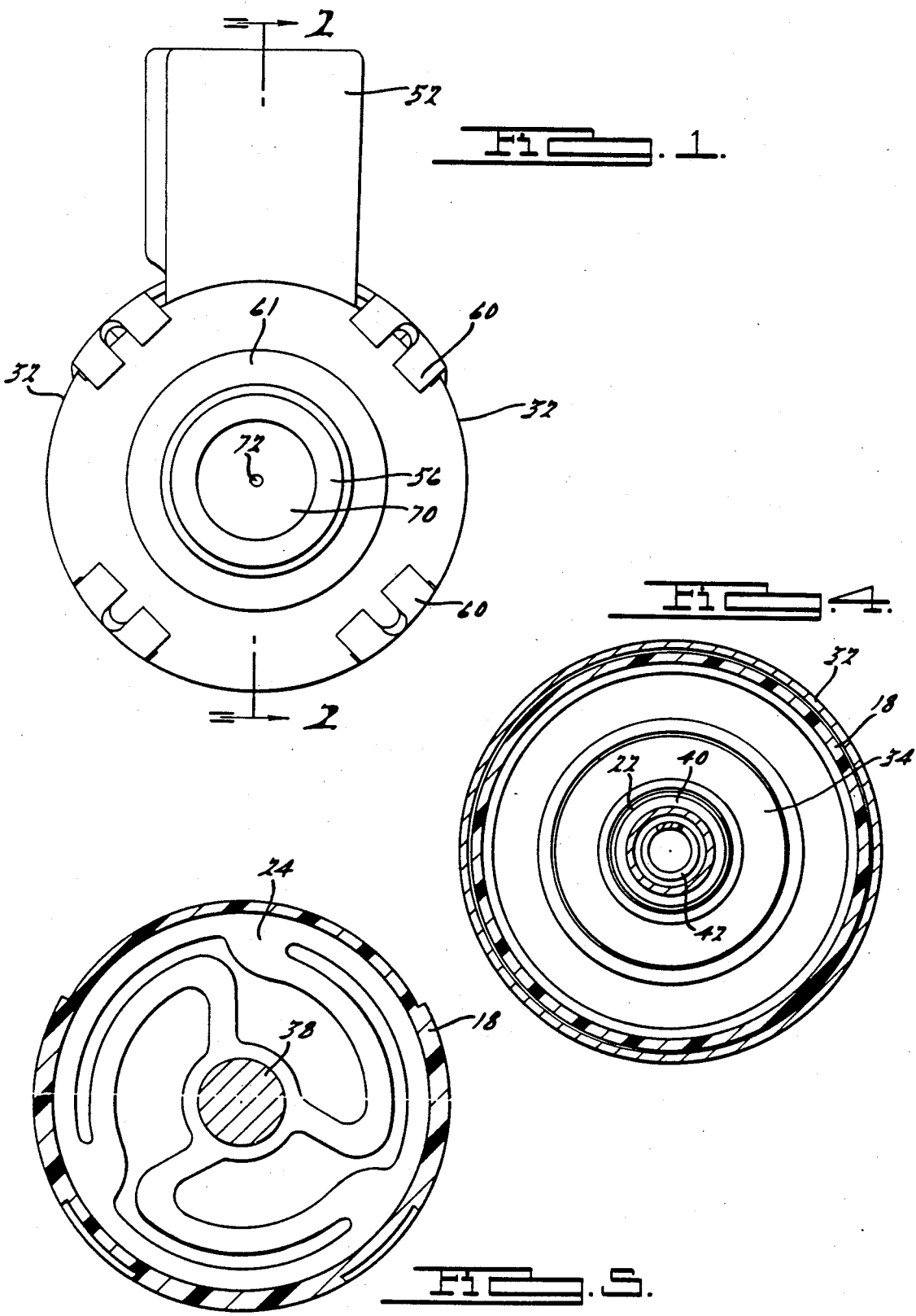
FIG. 1 is an end elevational view of the proportional variable force solenoid valve of the present invention.

Referring to FIGS. 1 through 5, the proportional variable force solenoid control valve 10 includes valve member 12 and solenoid 14. The solenoid 14 includes an electromagnetic coil 16 wound with approximately 700 turns about a plastic bobbin 18 which has a cylindrically shaped bore hole 20 through the longitudinal axis thereof. An armature 22 formed of ferromagnetic material such as leaded steel is suspended within the bore hole 20 of the plastic bobbin 18 by a pair of plate springs 24, 26 mounted at opposite ends of the armature 22. The plate springs 24, 26 are formed from very thin stainless steel and have a configuration, best seen in FIG. 5, which provides a very low spring rate. These plate springs 24, 26 suspend the armature for free axial longitudinal movement within the bobbin 18 while at the same time isolating the armature 22 from noise, vibration and interference with the remaining structure of the solenoid 14. A substantially doughnut shaped, flat, steel flux washer 28 is disposed within a recess 30 formed in the front end of the bobbin 18. Flux washer 28 is formed from a pair of identical opposing C-shaped halves contacting each other with each half having a cut out at the top to accommodate a portion of the top of the bobbin. The flux washer 28 contacts the steel shell 32 which forms an outer housing for the solenoid 14 and thereby provides a concentration of flux of the electromagnetic field at the front end of the armature 22. An axially magnetized ring magnet 34 (FIGS. 2 and 3) is disposed in an annular recess 36 at the rear end of the bobbin 18 axially rearward from the coil 16. Ring magnet 34 is formed of rare earth samarium cobalt which has generally superior performance characteristics such as greater energy products permitting a reduced size magnet resulting in a compact solenoid in addition to enhanced stability, for example, minimum loss of magnetism due to elevated temperatures. The axially magnetized ring magnet 34 is significantly less expensive than a radially magnetized ring magnet which would necessarily require a plurality of radially magnetized pieces. Ring magnet 34 produces a magnetic field equivalent to approximately 1200 amp turns and thus substantially saturates the armature 22 even in the absence of current to the coil 16. Thus, a relatively smaller electromagnetic field is required to move the armature 22 between the positions shown in FIGS. 2 and 3.

The armature 22 is hollow with a steel seal plug 38 press fit into its front end. A cup shaped spring retainer 40 formed of half hardened brass is press fit into the opposite or rearward end of the armature 22. A coil spring 42 is trapped between the inside of the spring retainer 40 and a plastic cap screw 44 threadably received in a threaded central aperture of the plastic end cap 46. The outer end of the end cap 46 includes an hexagonal socket 48 providing means for adjusting, via a tool such as an allen wrench, the force exerted by the coil spring 42 on the armature 22. The plate spring 26 is trapped between a shoulder near the outer edge of the rear of the bobbin 18 and the inner edge of the end cap 46 which in turn is held in place by the rear flange 50 of the shell 32 which engages an annular shoulder on the end cap 46.

A plastic connector body 52 is mounted on top of bobbin 18 and extends under a raised area at the top front of shell 32. Electrical contacts 54 extend upward through the bobbin 18 and through apertures in the connector body 52. The lower ends of the electrical contacts 54 are connected to the wires of the electromagnetic coil 16 for receiving an electrical current input signal from a variable current source (not shown).

The valve member 12 includes an aluminum nozzle 56 having an end wall 58 which is secured to the solenoid 14 by a plurality of tabs 60 extending from the shell 32 and crimped over the front portion of the end wall 58 (FIG. 1). An elastomeric diaphragm 62 is sandwiched between the end wall 58 and the front of the bobbin 14. The diaphragm 62 includes a central opening which is received in an annular recess 64 on the central portion of the sealed plug 38. The diaphragm 62 seals and thereby protects the solenoid 14 from contaminants which might pass through the valve member 12 with the flow of pressurized fluid. This seal greatly enhances the reliability as well as the durability of the solenoid 14. The nozzle 56 includes a longitudinal passageway 66 having a cylindrical configuration which houses a cylindrical nozzle filter 68 having openings provided at its opposite ends. The nozzle filter 68 is formed of nylon mesh mounted about a plastic frame and filters particulate matter from the control ports 80. A supply plug 70 of half hardened brass is press fit into the open front end of the longitudinal passageway 66. The supply plug 70 includes an inlet 72 having a diameter of approximately .030 inches. Inlet 72 communicates with four exhaust ports 74 each having a diameter of approximately .125 inches via outlet 76 extending longitudinally from the inner end of the passageway 66 through a valve seat forming a sharp edge orifice 78 with a diameter of approximately .080 inches. The front face of the seal plug 38 disposed adjacent the sharp edge orifice 78 forms a poppet valve 84. Four control ports 80 each having a diameter of approximately .090 inches are disposed about the nozzle 56. Poppet valve 84 regulates the pressure of the fluid flowing out control ports 80 by opening to permit pressurized fluid to be exhausted out exhaust ports 74 thereby reducing the pressure of the fluid flowing through the control ports 80 in direct proportion to the opening of the poppet valve in accordance with the linear movement of the armature 22 which in turn is directly proportional to the amount of current supplied to the coil 16 of the solenoid 14. An 0-ring seal 82 is provided between the rear end of the nozzle filter 68 and the inner end wall of the passageway 66.

A wave washer 61 helps to hold the nozzle 56 firmly in place when mounted in the fluid system such as a vehicle transmission housing (not shown). Notches 63 may be formed in the outer surface of nozzle 56 to receive a fastener clip (not shown) for securing the nozzle 56 to the transmission housing.

Figure 2:
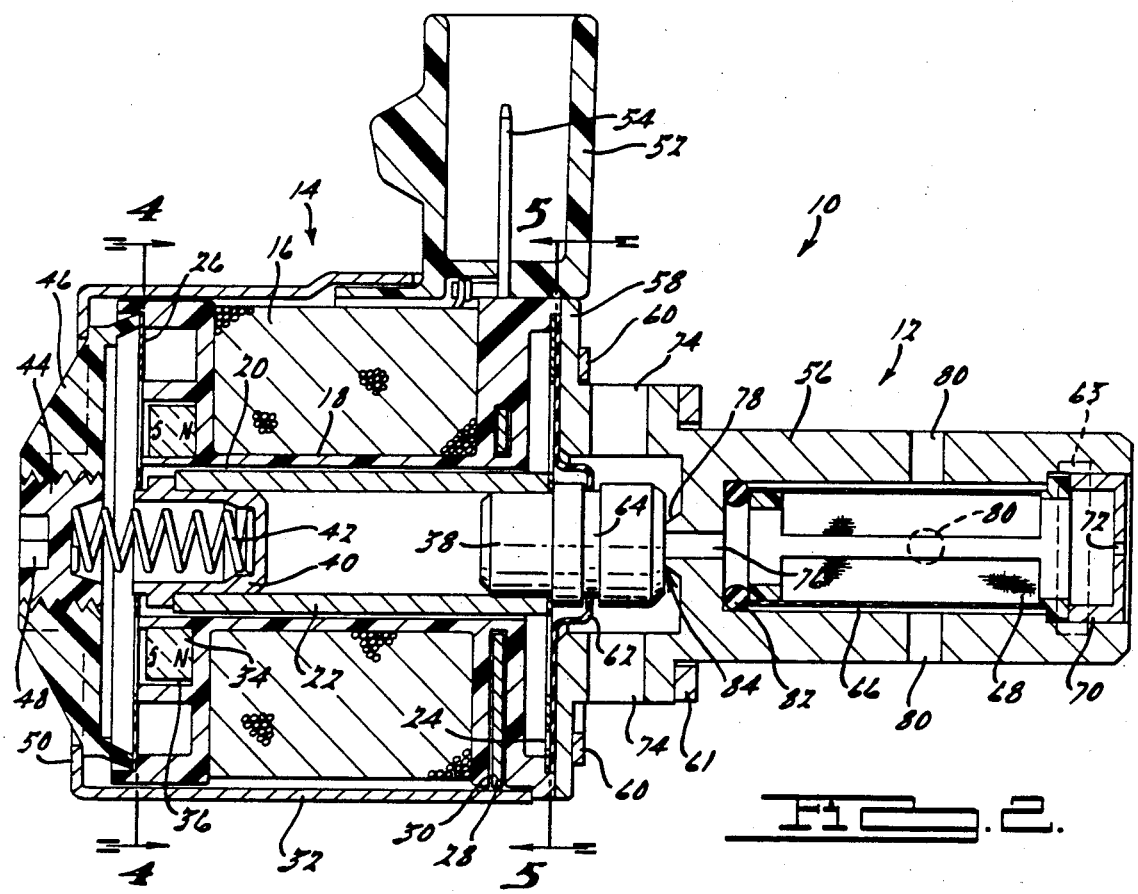
FIG. 2 is a view in longitudinal cross section, taken along the line 2—2 in FIG. 1 showing the valve in the closed position.
Figure 3:
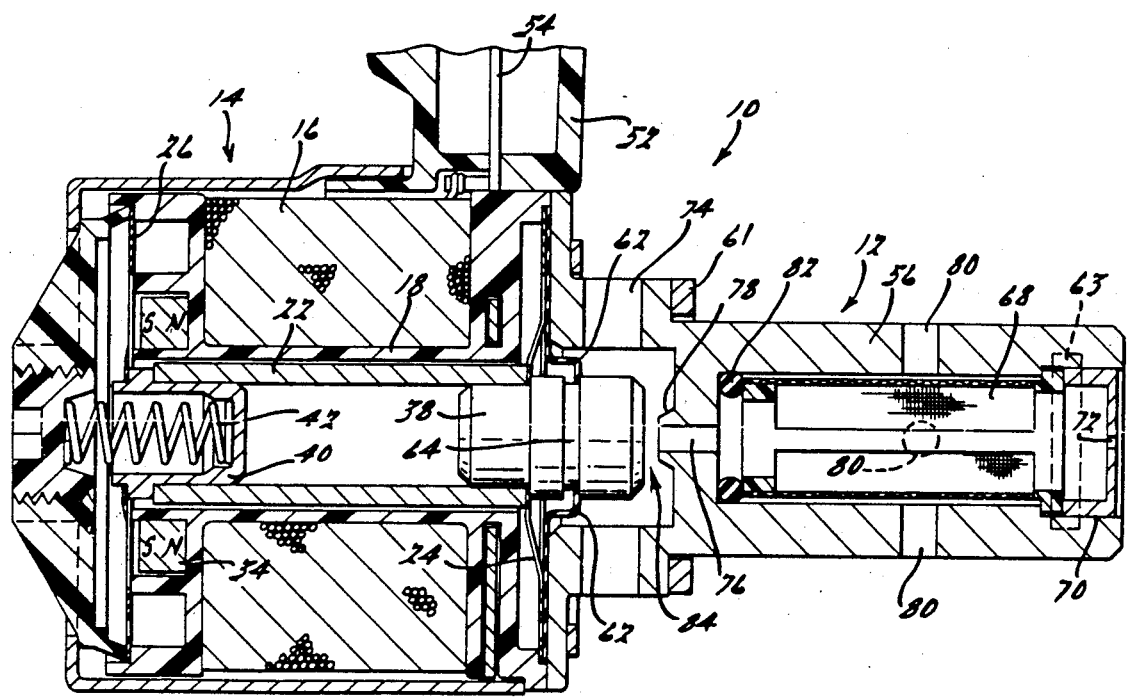
FIG. 3 is a partially fragmented view in longitudinal cross section, taken along the line 2-2 in FIG. 1 showing the valve in the open position.

Referring to FIGS. 2 and 3, the operation of the proportional variable force solenoid control valve of the present invention will now be described. The inlet 72, exhaust ports 74 and control ports 80 of the nozzle 56 are connected to the pressurized fluid system in which pressurized fluid is supplied to the inlet 72 and flows out the control ports 80. Valve 84 is opened by the solenoid 14 as described previously to regulate the pressure of the fluid flowing out the control ports 80 by diverting fluid to the exhaust ports 84. The opening of the valve 84 in turn is controlled by linear displacement of the armature 22 in proportion to the amount of electrical current supplied to the solenoid 14 via electrical contacts 54. In the normally closed position as shown in FIG. 2 with no current flowing, there is no electromagnetic field and the coil spring 42 biases the armature 22 toward the position shown in FIG. 2 wherein the valve 84 is in the closed position with the face of the seal plug 38 sealed against the sharp edge orifice 78 thereby preventing the flow of pressurized fluid from the outlet 76 to the exhaust ports 74. The force of the coil spring 42 is sufficient to overcome the magnetic field created by the radially magnetized ring magnet 34 in addition to the force of the pressurized fluid against the face of the seal plug 38. With the valve 84 in this position, pressurized fluid entering the nozzle 56 through inlet 72 passes through the open front end of filter 66, through the nylon mesh of filter 66, and out the control ports 80. In this position, the fluid flowing out of the control ports 80 is at maximum pressure which can be reduced in a regulated fashion by applying electrical current to the coil 16 via contacts 54 creating an electromagnetic field which in addition to the magnetic field created by ring magnet 34 together with the force caused by the pressurized fluid through sharp edge orifice 76 against the face of the seal plug 38 overcomes the opposing spring force of the coil spring 42 and the relatively slight force of the plate springs 24, 26 thereby moving the armature 22 to the position shown in FIG. 3 corresponding to a maximum opening of the valve 84. This position permits maximum fluid flow out the exhaust ports 74 resulting in minimum pressure of the fluid flowing out of the control ports 80. The pressure of the fluid may be varied between the maximum and minimum valves directly proportional to the amount of current applied to the coil 16.

For example, in a typical application of the proportional variable force solenoid control valve of the present invention, the nozzle 56 is inserted into an automobile transmission housing to modulate the main line pressure to control several spool valves disposed in an electronic transmission control system thereby controlling the smoothness of shifting between gears of the electronic transmission. In such an application, fluid pressurized at approximately 200 psi is provided to the inlet 72. The spring force of the coil spring 42 is adjusted via the cap screw 44 to slightly open the valve 84 with no current supplied to the coil 16, thereby creating a slight bleed of fluid between the sharp edge orifice 76 and the face of the seal plug 38 and out the exhaust ports 74. The pressure of the fluid then flowing out of control ports 80 may be linearly controlled in proportion to the amount of current subsequently provided to the coil 16 via contacts 54 in the manner previously described. The elastomeric diaphragm 62 which is sealed about the central portion of the seal plug 38 within the annular recess or groove 64 flexes with the movement of the seal plug thereby protecting the solenoid 14 from contaminants which could be carried by the pressurized fluid in the chamber which communicates between the sharp edge orifice 76 and the exhaust ports 74 during operation of the valve 84.

Thus, a proportional variable force solenoid operated valve is provided utilizing a solenoid operator which does not require a trunk pole piece or any other such core device. The result is significantly more liberal manufacturing tolerances which otherwise would need to be close tolerances to maintain the required precise air gap associated with a core device. This coreless construction further eliminates the need to adjust such an air gap to maintain linear control for various input pressures. Manufacturing costs are reduced and reliability is improved in a more compact design of the proportional variable force solenoid operated valve of the present invention.

Although a preferred embodiment of the proportional variable force solenoid control valve of the present invention has been shown and described in detail, it should be noted that variations or modifications may be made without departing from the spirit or scope of the present invention.

We claim:

1. A proportional variable force solenoid valve for controlling the pressure of pressurized fluid in a fluid control system in proportion to the current level of an electrical input signal comprising:
   a valve member including a movable valve adapted for controlling the pressure of pressurized fluid in said fluid control system;
   a solenoid connected to said valve member, said solenoid including an armature having one end connected to said movable valve t o move said armature between first and second axial positions in accordance with the current level of said electrical input signal, an electromagnetic coil connected to said electrical input signal for generating an electromagnetic field and including a longitudinal bore hole extending therethrough, means for suspending said armature within said bore hole at each end of said armature for axial movement between said first and second axial positions, means for resiliently biasing said armature toward said first position, a permanent ring magnet magnetically coupled between one of said suspending means and said coil and adjacent one end of said armature, said permanent ring magnet producing a magnetic force in said second axial direction and substantially saturating said armature whereby said armature is axially moved between said first and second axial positions in proportion to the current level of said electrical input signal.

2. The proportional variable force solenoid valve of claim 1 comprising:
   an elastomeric diaphragm having a central portion in sealing engagement with said movable valve for movement therewith, said diaphragm having a radially outward portion sandwiched between said valve member and said solenoid to protect said solenoid from contaminants carried by said pressurized fluid.

3. The proportional variable force solenoid valve of claim 1 wherein said resilient biasing means comprises a coil spring and said armature includes a pocket formed in said armature for retaining said coil spring.

4. The proportional variable force solenoid valve of claim 3 further comprising means for adjusting the compression of said coil spring.

5. The proportional variable force solenoid valve of claim 1 wherein said valve member comprises a nozzle having an inlet, at least one control port, a chamber in communication with said inlet and said control port, at least one exhaust port, and wherein said valve comprises a poppet valve for controlling the flow of pressurized fluid from said nozzle chamber to said exhaust port.

6. The proportional variable force solenoid valve of claim 5 comprising a nozzle filter disposed in said chamber to filter particulate matter in said pressurized fluid entering said chamber through said inlet from flowing out said at least one control port.

7. A variable force proportional solenoid valve comprising:
   a bobbin having a longitudinal bore hole through the axis thereof;
   an electromagnetic coil wound about said bobbin;
   a connector in electrical contact with said electromagnetic coil for applying a variable current signal to said electromagnetic coil for producing an electromagnetic field;
   a cylindrical armature;
   a plate spring connected to each end of said cylindrical armature for suspending said armature within said longitudinal bore hole of said bobbin for axial movement therein between first and second armature positions in accordance with the current level of said variable current signal;
   a coil spring biasing said armature toward said first position;
   an axially magnetized permanent ring magnet disposed between one of said plate springs and said electromagnetic coil and about one end of said armature, said ring magnet producing a magnetic force which substantially saturates said armature in the same direction as said electromagnetic field biasing said armature toward said second position whereby the axial movement of said armature between said first and second axial positions is in proportion to the current level of said variable current signal.

8. The variable force proportional solenoid of claim 7 wherein said bobbin includes a thin recess at one end, and a flux washer disposed in said recess for concentrating electromagnetic flux at said one end.

9. The variable force proportional solenoid of claim 7 wherein said axially magnetized permanent ring magnet produces a magnetic field having a force equivalent to at least 1.5 times the force of said electromagnetic field when said variable current signal is at one amp current level.

10. The variable force proportional solenoid of claim 9 wherein said axially magnetized permanent ring magnet is formed of rare earth samarium cobalt.

11. A proportional variable force solenoid valve for controlling the pressure of pressurized fluid in a fluid control system in proportion to the current level of an electrical input signal comprising:

a valve member including a movable valve adapted for controlling the pressure of pressurized fluid in said fluid control system;

a solenoid connected to said valve member, said solenoid including an armature having one end connected to said movable valve to move said armature between first and second axial positions in accordance with the current level of said electrical input signal, an electromagnetic coil connected to said electrical input signal for generating an electromagnetic field and including a longitudinal bore hole extending therethrough, means for suspending said armature within said bore hole at each end of said armature for axial movement between said first and second positions, means for resiliently biasing said armature toward said first position, a permanent ring magnet magnetically coupled between one of said suspending means and said coil and surrounding one end of said armature so that the ring magnet generates a magnetic force in an axial direction opposite the force of the biasing means whereby the magnetic field of said permanent magnet substantially saturates said armature without generation of aid electromagnetic field by said electromagnetic coil and said armature is axially moved upon generation of said electromagnetic field between said first and second axial positions in proportion to the current level of said electrical input signal.

12. A variable force proportional solenoid valve comprising:

an electromagnetic coil including a longitudinal bore hole extending therethrough;

a connector in electrical contact with said electromagnetic coil for applying a variable current signal to said electromagnetic coil for producing an electromagnetic field;

a cylindrical armature;

a plate spring connected to each end of said cylindrical armature for suspending said armature within said longitudinal bore hole for axial movement therein between first and second armature positions in accordance with the current level of said variable current signal;

a coil spring biasing said armature toward said first position;

an axially magnetized permanent ring magnet magnetically coupled between one of said plate springs and said electromagnetic coil and about one end of said armature so that said permanent ring magnet produces a magnetic force in an axial direction opposite the force of said coil spring without application of said variable current signall to said electromagnetic coil whereby the magnetic force produced by said permanent ring magnet substantially saturates said armature in the same direction as said electromagnetic field thereby biasing said armature toward said second position whereby the axial movement of said armature between said first and second axial positions is in proportion to the current level of said variable current signal.

13. A variable force proportional solenoid comprising an electromagnetic coil adapted to be electrically connected to a variable source of electrical current such that said electromagnetic coil produces a magnetic field that varies with the level of current applied thereto, said electromagnetic coil formed with a longitudinal aperture therethrough, an armature, means for suspending said armature for longitudinal movement within said longitudinal aperture at each end of said armature, means for resiliently biasing said armature in one longitudinal direction, and a permanent magnet magnetically coupled between one of said suspending means and said coil and disposed adjacent one end of said armature and magnetically biasing said armature in the direction opposite said one direction whereby said permanent magnet produces a magnetic field sufficient to substantially saturate said armature without aid of said electromagnetic field and enable said armature to be longitudinally moved in accordance with the level of current applied too said electromagnetic coil.

14. The variable force solenoid of claim 13 wherein said permanent magnet comprises a permanent ring magnet.

15. The variable force solenoid of claim 13 wherein said permanent magnet is an axially magnetized permanent ring magnet.

16. The variable force solenoid of claim 15 wherein said axially magnetized permanent ring magnet is formed of rare earth samarium cobalt.

17. The variable force solenoid of claim 15 wherein said axially magnetized permanent ring magnet produces a magnetic field equivalent to at least 1.5 times the force of said electromagnetic field when said variable current source connected to said electromagnetic field is at a one amp current level.

18. The variable force solenoid of claim 15 wherein said axially magnetized permanent ring magnet is disposed immediately adjacent said one end of said armature.

19. The variable force solenoid of claim 18 further comprising a flux washer disposed adjacent the end of said armature opposite said one end for concentrating electromagnetic flux at said opposite end.

20. The variable force solenoid of claim 13 wherein said resilient biasing means comprises a coil spring and said armature includes a pocket formed therein to receive a portion of said coil spring.

21. A proportional variable force solenoid valve for controlling the pressure of pressurized fluid in a fluid control system in proportion to the current level of a source of electrical current comprising:

a solenoid including an electromagnetic coil adapted to be electrically connected to a variable source of electrical current such that said electromagnetic coil produces a magnetic field that varies with the level of current applied thereto, said electromagnetic coil formed with a longitudinal aperture therethrough, an armature, means for suspending said armature at each end thereof for longitudinal movement within said longitudinal aperture, means for resiliently biasing said armature in one longitudinal direction, a permanent magnet magnetically coupled between said one of said suspending means and said coil and adjacent one end of said armature so that said permanent magnet magnetically biases said armature in the direction opposite said one direction whereby said permanent magnet produces a magnetic field sufficient to substantially saturate said armature without aid of said electromagnetic field and enable said armature to be longitudinally moved in accordance with the level of current applied to said electromagnetic coil, and a movable valve member coupled to said armature and adapted for controlling the pressure of pressurized fluid in said fluid control system in accordance with the longitudinal movement of said armature.

22. The proportional variable force solenoid valve of claim 21 comprising:

an elastomeric diaphragm having a central portion in sealing engagement with said movable valve member for movement therewith, said diaphragm having a radially outward portion sandwiched between said valve member and said solenoid to protect said solenoid from contaminants carried by said pressurized fluid.

23. The proportional variable force solenoid valve of claim 22 wherein said resilient biasing means comprises a coil spring and said armature includes a pocket formed in said armature for retaining said coil spring.

24. The proportional variable force solenoid valve of claim 23 further comprising means for adjusting the compression of said coil spring.

25. The proportional variable force solenoid valve of claim 21 wherein said valve member comprises a nozzle having an inlet, at least one control port, a chamber in communication with said inlet and said control port, at least one exhaust port, and wherein said valve comprises a poppet valve for controlling the flow of pressurized fluid from said nozzle chamber to said exhaust port.

26. The proportional variable force solenoid valve of claim 25 comprising a cylindrical nozzle filter disposed in said chamber to filter particulate matter in said pressurized fluid entering said chamber through said inlet from flowing out said at least one control port.

* * * * *